United States Patent Office 2,755,259
Patented July 17, 1956

2,755,259

PLASTICIZED COMPOSITIONS

Max Henry Dilke, Coulsdon, Donald Faulkner, Epsom, and Sidney Merry, Edgware, England, assignors to The Distillers Company Limited, Edinburgh, Scotland, a British company No Drawing. Application August 4, 1952,
Serial No. 302,632

Claims priority, application Great Britain August 23, 1951

14 Claims. (Cl. 260—8)

The present invention relates to plasticised compositions of vinylidene chloride polymers and copolymers. More particularly it relates to plasticisers for such polymers or copolymers.

Polymers and copolymers of vinylidene chloride are capable of being softened under the influence of heat and pressure, and may thus be moulded to form useful articles, whilst some may be extruded and drawn to form useful fibres or filaments. Such polymers, however, have the disadvantage that they tend to darken and decompose at temperatures above their softening points. It is customary to add a plasticiser to the polymer in order to reduce the softening temperature to a level where thermal decomposition becomes less serious, but, with many plasticisers, this level is only reached at concentrations of plasticiser which unduly impair the physical properties of moulded articles or filaments.

Plasticised compositions of vinylidene chloride polymers or copolymers are subject to the further disadvantage that they undergo some decomposition when exposed for long periods to the effects of light, especially when such light contains a high proportion of ultra violet radiation. This decomposition is accompanied by a progressive darkening in colour of the composition, which may change from a practically colourless appearance to dark brown if the action of the radiation is prolonged. General deterioration in mechanical properties may also occur. To reduce the deleterious effects of exposure to radiation, it is, therefore, customary to incorporate light stabilisers, for example salicylic esters such as phenyl salicylate and p-xenyl salicylate, methyl, ethyl and butyl esters of 2-hydroxy - 3 - naphthoic acid, substituted 2-hydroxybenzophenones, such as 5 - chloro-, 4 - chloro-, 5 - methyl-, 4 - methyl-, 3:4 - dimethyl-, 4:6 - dimethyl, 3:4:6 - trimethyl- and 3:5 - dichloro - 2 - hydroxybenzophenone, substituted 2- hydroxyacetophenones such as 5-methyl and 5-chloro-2-hydroxy acetophenone, fluorenone azine, and mixed fluorenone azines such as benzal- and salicylalfluorenone azine.

It is an object of the invention to provide plasticised polyvinylidene chloride compositions of adequate thermal stability at the working temperature when the plasticisers are used in sufficiently low concentrations to give products of adequate rigidity or tensile strength. It is a further object to provide plasticised compositions of adequate light stability.

It has been found, however, that the effiiciency of a light stabiliser in a polymeric vinylidene chloride composition depends to a considerable extent on the particular plasticiser incorporated in the composition. Many of the more commonly used plasticisers give compositions showing poor light stability. Thus, the higher alkyl phthalates such as dibutyl and di-2-ethylhexyl phthalates give compositions which extrude to form coloured filaments which undergo fairly rapid further discolouration on exposure to sunlight or ultra violet radiations. Tricresyl and trixylenyl phosphates give compositions which resist thermal degradation somewhat better, but show an even poorer light stability. To permit the fabrication of useful filaments or articles showing an adequate light stability from vinylidene chloride polymers or copolymers, therefore, special plasticisers, such as alpha-alpha'-diphenyldiethyl ether have been developed. These special plasticisers are often expensive and difficult to obtain commercially. The provision of a readily available plasticiser fulfilling the requirements indicated above is, therefore, of great commercial advantage.

We have now discovered, unexpectedly in view of poor results obtained with other phthalates, that dimethyl phthalate and dimethyl tetrachlorophthalate are excellent plasticisers for crystalline vinylidene chloride polymers and copolymers.

According to the present invention a plasticised composition is provided comprising a crystalline polymeric resin having at least 70% by weight of vinylidene chloride units in its molecular structure and, as plasticiser therefor, dimethyl phthalate or dimethyl tetrachlorophthalate. By the term "vinylidene chloride units" we mean —CH$_2$—CCl$_2$ groups derived from the vinylidene chloride monomer.

The amount of plasticiser which may usefully be incorporated in the vinylidene chloride polymer or copolymer depends to some extent on the particular copolymer chosen and on the properties desired in the final product; in general, plasticiser contents of from 5 to 25 per cent by weight on the weight of polymer or copolymer are suitable. With a fibre-forming copolymer prepared from a monomer mixture of 85% by weight of vinylidene chloride and 15% by weight of vinyl chloride, the preferred quantity of plasticiser is in the range 6 to 12% by weight on the weight of the copolymer. With less than 5% by weight of plasticiser, the composition does not flow readily enough on heating, and the extruded filament is discoloured, whilst with more than 14% by weight of plasticiser, the tensile strength of the extruded filament is low, and there is a tendency to exudation of plasticiser.

The above plasticisers, dimethyl phthalate and dimethyl tetrachlorophthalate, may be incorporated, with advantage, according to the present invention, in any polymers of vinylidene chloride and in copolymers of vinylidene chloride containing more than about 70% by weight of vinylidene chloride units, such polymers and copolymers being characterised by their ability to exist in crystalline and orientated crystalline states. Suitable copolymers are those of vinylidene chloride with one or more monomers such as vinyl chloride, methyl acrylate, ethyl acrylate, methyl methacrylate, dimethyl maleate and fumarate, diethyl maleate and fumarate, vinyl acetate, acrylonitrile, and other copolymers which require plasticisation in order to reduce thermal decomposition during processing, and whose final compositions must show adequate stability when exposed to light. When used for the production of fibres or filaments, the preferred copolymers are prepared from binary mixtures of vinylidene chloride and vinyl chloride, and from the ternary mixtures of vinylidene chloride, vinyl chloride, and an ester selected from the group dimethyl maleate, dimethyl fumarate, diethyl maleate, and diethyl fumarate. Such ternary copolymers, when plasticised with dimethyl phthalate or dimethyl tetrachlorophthalate, show increased heat and light stability compared with the binary copolymers of vinylidene chloride and vinyl chloride similarly plasticised. These ternary copolymers may be satisfactorily prepared in aqueous dispersion by methods used for obtaining binary vinylidene chloride-vinyl chloride copolymers. Suitable non-ionic dispersing agents are mentioned in British Patent No. 640,120.

It has been discovered, moreover, that gelatine is a particularly satisfactory dispersing agent in that copolymers of improved light stability may be obtained by its use.

The manner in which the plasticisers of this invention are added to the vinylidene chloride polymer or copolymer is not critical, provided that intimate mixing is obtained, and the resulting compositions, however prepared, show satisfactory flow properties and adequate heat stability at the temperatures required for processing. Thus, for example, the plasticiser may be added directly to the finely powdered polymer or copolymer, and intimate mixing effected by mechanical means, such as grinding in a ball mill. Alternatively, the plasticiser may be dissolved in a volatile organic solvent, such as acetone or benzene, the solution thoroughly mixed with the powdered polymer or copolymer, and the solvent removed from the resulting composition by evaporation. If the vinylidene chloride copolymer is sufficiently soluble in an organic solvent, the plasticiser may be added to the solution to form a homogeneous mixture and the plasticised composition recovered by evaporation. If the vinylidene chloride polymer or copolymer is available in the form of an aqueous dispersion of small particles, a solution of the plasticiser in a water-miscible organic solvent, such as ethanol, acetone, or dioxan, may be added slowly with stirring to such an aqueous dispersion, and the resulting uniform polymeric composition separated by filtration or other suitable means and subsequently dried. Alternatively the plasticiser may be added to the monomer mixture prior to such polymerisation; at the end of polymerisation, an intimate mixture of plasticiser and finely divided polymer or copolymer may be separated by coagulation, filtration, or other suitable means.

The plasticisers of this invention exert sufficient plasticising action at high temperatures to permit extrusion of the compositions with a minimum of thermal degradation, and, provided an effective light stabiliser has also been included in the compositions, the extruded compositions show considerable stability to sunlight and light containing a high proportion of ultra violet radiation. They may be exposed in a fadeometer to light from a carbon arc for over 500 hours without undergoing undue discolouration or degradation. This performance is superior to that obtained from similar compositions incorporating many other commonly available plasticisers, and is comparable with that obtainable by using less readily available, specially developed plasticisers. Dimethyl tetra-chlorophthalate also shows the above advantages of providing compositions based on vinylidene chloride polymers or copolymers which show good heat and light stability; it is not so readily available as dimethyl phthalate, but has a lower volatility. In addition to light stabilisers, compositions in which the plasticisers are incorporated may also contain, or be compounded with, lubricants, pigments, dyes and the like, used for the purpose of facilitating the processing of the compositions and for providing the required colour in the final article. Other heat or light-stabilisers used or described in the art may also be present.

The following examples illustrate the practice of the invention, percentages referred to being by weight unless otherwise specified, and temperatures being in degrees centigrade. Parts by weight bear the same relation to parts by volume as do grams to cubic centimetres.

EXAMPLE 1

A copolymer containing about 88% by weight of vinylidene chloride units was prepared from a monomer mixture consisting of 85% by weight of vinylidene chloride and 15% by weight of vinyl chloride. Portions of 10 parts by weight of the finely powdered copolymer were mixed thoroughly with solutions of 0.2 parts by weight of 5-chloro-2-hydroxybenzophenone as light stabiliser and 1.0 part by weight of each of the plasticisers listed in Table I, the light stabiliser and plasticiser being dissolved together in 5–10 parts by volume of acetone. After removing the acetone by drying in a vacuum oven, the resulting compositions were formed into pellets and extruded from a small ram extruder through an orifice 0.030 inch in diameter, the barrel of the extruder being heated to a temperature of 170–175°. The filaments so obtained were drawn by hand so that the diameter was reduced to 0.008 to 0.010 inch. The resulting threads were wound on formers and exposed to light from a carbon arc in a fadeometer until the specimens had reached approximately the same degree of degradation, as compared with a standard obtained by exposing a fibre prepared from a composition of the same copolymer with 10% by weight of alpha-alpha'-diphenyl diethyl ether as plasticiser but without light stabiliser for 20 hours. The number of hours required for specimens containing the different plasticisers to undergo the standard degradation is given in Table I.

Table I

| Plasticiser | Hours exposed |
|---|---|
| Trixylenyl phosphate | 140 |
| Tricresyl phosphate | 130 |
| Triphenyl phosphate | 260 |
| Dibutyl phthalate | 240 |
| Dimethyl phthalate | 500 |
| Dimethyl tetrachloro phthalate | 520 |

EXAMPLE 2

The process of Example 1 was repeated except that no light stabiliser was added to the compositions, which were plasticised with the plasticisers indicated in Table II:

Table II

| Plasticiser | Colour of Extruded filament |
|---|---|
| Dibutyl phthalate | Pale brown. |
| α:α'-diphenyl-diethyl ether | Light colour. |
| Dimethyl phthalate | Do. |
| Dimethyl tetrachlorophthalate | Do. |

EXAMPLE 3

Uniform compositions were prepared from the finely powdered copolymer of Example 1 and different amounts of dimethyl phthalate. The plasticised compositions were extruded in a vertical screw extruder having a screw diameter of 0.620 inch. The barrel of the extruder was heated by circulating oil, the maximum temperature being 173–175°. From the die, of 0.031 inch diameter, the extruded filament was cooled in a tank of water, and then stretched four-fold by means of two sets of rollers, the second set rotating at four times the speed of the first. The appearance of the resulting fibres was noted, and their tenacities determined. The results are given in Table III.

Table III

| Percent Dimethyl Phthalate | Tenacity, grams/denier | Appearance |
|---|---|---|
| 14 | 0.86 | Pale colour, slightly tacky. |
| 11 | 1.21 | Pale colour, not tacky. |
| 8 | 1.22 | Do. |
| 5 | 1.35 | Brownish colour. |

The results of Table III show that with 14% by weight of dimethyl phthalate, the strength of the fibre is appreciably lowered, whilst with 5% by weight of plasticiser the degree of plasticisation at the extrusion temperature is not sufficient to prevent thermal degradation, chiefly due to the longer residence time of the polymer in the barrel of the extruder.

EXAMPLE 4

The process of Example 1 was repeated with a copolymer prepared from a mixture of 84% by weight vinylidene chloride, 14% by weight vinyl chloride and 2% by weight of diethyl maleate. Compositions of this copolymer with 10% by weight of the plasticisers listed in Table IV, together with 2% by weight of 5-chloro-2-hydroxybenzophenone were converted into filaments and exposed as described in Example 1. The times required for the filaments to reach the standard degree of degradation are given in Table IV.

*Table IV*

| Plasticiser | Hours exposed |
|---|---|
| Trixylenyl phosphate | 170 |
| Triphenyl phosphate | 290 |
| Dibutyl phthalate | 270 |
| Dimethyl phthalate | 650 |

EXAMPLE 5

Four ternary copolymers were prepared using diethyl and dimethyl maleates as third monomer, and polyglyceryl stearate and gelatine as dispersing agents; in each case, the dimethyl phthalate used as plasticiser was added to the monomer mixture before polymerisation. The charge for each copolymer contained the following:

|   | Parts by weight |
|---|---|
| Vinylidene chloride | 85 |
| Vinyl chloride | 15 |
| Caprylyl peroxide | 0.4 |
| Dimethyl phthalate | 7.6 |
| Water | 400 |

Amounts of third monomer, dispersing agent, and sodium pyrophosphate (anhydrous) as buffer are given in Table V below, the parts being by weight. Each charge was polymerised with continuous agitation in a stainless steel vessel at 57—58° C. for 36 hours, and the copolymer filtered off and dried. Samples of each copolymer were compounded with 2% by weight of 5-chloro-2-hydroxybenzophenone, the compositions extruded to form filaments, and the light stabilities of the filaments evaluated as described in Example 1. Exposure times for the four copolymers are given in Table V:

*Table V*

| Run No. | Third Monomer | Dispersing Agent | Buffer, parts | Hours Exposed |
|---|---|---|---|---|
| 171 | 2 parts diethyl maleate. | 0.5 part polyglyceryl stearate. | 0.25 | 750 |
| 173 | do | 0.5 part Gelatine | 0.26 | 1,390 |
| 177 | 1 part diethyl maleate. | 0.3 part Gelatine | 0.26 | 1,095 |
| 178 | 1 part dimethyl maleate. | 0.45 part Gelatine | 0.17 | 820 |

We claim:

1. A plasticised composition comprising a crystalline polymeric resin having at least 70% by weight of vinylidene chloride units in its molecular structure and, as plasticiser therefor, an ester selected from the group consisting of dimethyl phthalate and dimethyl tetrachlorophthalate.

2. A composition according to claim 1, wherein the plasticiser is present in amount of 5–25% by weight on the polymeric resin.

3. A compostion according to claim 1, wherein a light stabiliser for the polymeric resin is present.

4. A composition according to claim 1, wherein the polymeric resin is selected from the group consisting of vinylidene chloride-vinyl chloride copolymers, vinylidene chloride-vinyl chloride-diethyl maleate copolymers and vinylidene chloride-vinyl chloride-dimethyl maleate copolymers.

5. A composition according to claim 4, wherein the plasticiser is present in an amount of 6–12% by weight on the polymeric resin.

6. A plasticised composition comprising a crystalline vinylidene chloride-vinyl chloride copolymer containing about 88% by weight of vinylidene chloride units plasticised with 10% by weight on the copolymer of dimethyl phthalate and incorporating a light stabiliser.

7. A plasticised composition comprising a crystalline vinylidene chloride-vinyl chloride copolymer containing about 88% by weight of vinylidene chloride units plasticised with 10% by weight on the copolymer of dimethyl tetrachlorophthalate and incorporating a light stabiliser.

8. A plasticised composition comprising a crystalline vinylidene chloride-vinyl chloride-diethyl maleate copolymer prepared from a mixture of the corresponding monomers containing 14% by weight of vinyl chloride and 2% by weight of diethyl maleate and plasticised with 10% by weight of dimethyl phthalate.

9. A plasticised composition comprising a crystalline vinylidene chloride-vinyl chloride-diethyl maleate copolymer prepared from a mixture of the corresponding monomers containing 14% by weight of vinyl chloride and 1% by weight of diethyl maleate and plasticised with 10% by weight of dimethyl phthalate.

10. A plasticised composition comprising a crystalline vinylidene chloride-vinyl chloride-dimethyl maleate copolymer prepared from a mixture of the corresponding monomers containing 14% by weight of vinyl chloride and 1% by weight of dimethyl maleate and plasticised with 10% by weight of dimethyl phthalate.

11. A composition according to claim 4, and containing gelatine as dispersing agent.

12. A composition comprising a crystalline vinylidene chloride-vinyl chloride-diethyl maleate copolymer and containing gelatine, prepared in aqueous dispersion using gelatine as the dispersing agent from a mixture of the corresponding monomers containing 14% by weight of vinyl chloride and 2% by weight of diethyl maleate and plasticised with 10% by weight of dimethyl phthalate.

13. A composition comprising a crystalline vinylidene chloride-vinyl chloride-diethyl maleate copolymer and containing gelatine, prepared in aqueous dispersion using gelatine as the dispersing agent from a mixture of the corresponding monomers containing 14% by weight of vinyl chloride and 1% by weight of diethyl maleate and plasticised with 10% by weight of dimethyl phthalate.

14. A composition comprising a crystalline vinylidene-chloride-vinyl chloride-dimethyl maleate copolymer and containing gelatine, prepared in aqueous dispersion using gelatine as the dispersing agent from a mixture of the corresponding monomers containing 14% by weight of vinyl chloride and 1% by weight of dimethyl maleate and plasticised with 10% by weight of dimethyl phthalate.

References Cited in the file of this patent

UNITED STATES PATENTS

| 2,142,279 | Menger | Jan. 3, 1939 |
| 2,484,483 | Berry | Oct. 11, 1949 |

FOREIGN PATENTS

| 881,970 | France | Feb. 8, 1943 |
| 916,651 | France | Aug. 26, 1946 |